C. T. GILMORE.
IRONING MACHINE.
APPLICATION FILED JAN. 19, 1910. RENEWED DEC. 22, 1911.

1,029,183.

Patented June 11, 1912.

7 SHEETS—SHEET 1.

Witnesses:
John Enders
Chas. H. Buell

Inventor:
Charles T. Gilmore.
By Dyrenforth, Lee, Chritton & Wiles
Attys.

C. T. GILMORE.
IRONING MACHINE.
APPLICATION FILED JAN. 19, 1910. RENEWED DEC. 22, 1911.

1,029,183.

Patented June 11, 1912.

7 SHEETS—SHEET 4.

C. T. GILMORE.
IRONING MACHINE.
APPLICATION FILED JAN. 19, 1910. RENEWED DEC. 22, 1911.

1,029,183.

Patented June 11, 1912.

7 SHEETS—SHEET 5.

Witnesses:
John Enders
Chas. H. Buell

Inventor:
Charles T. Gilmore.
By Dyrenforth, Lee, Chritton & Wiles,
Attys.

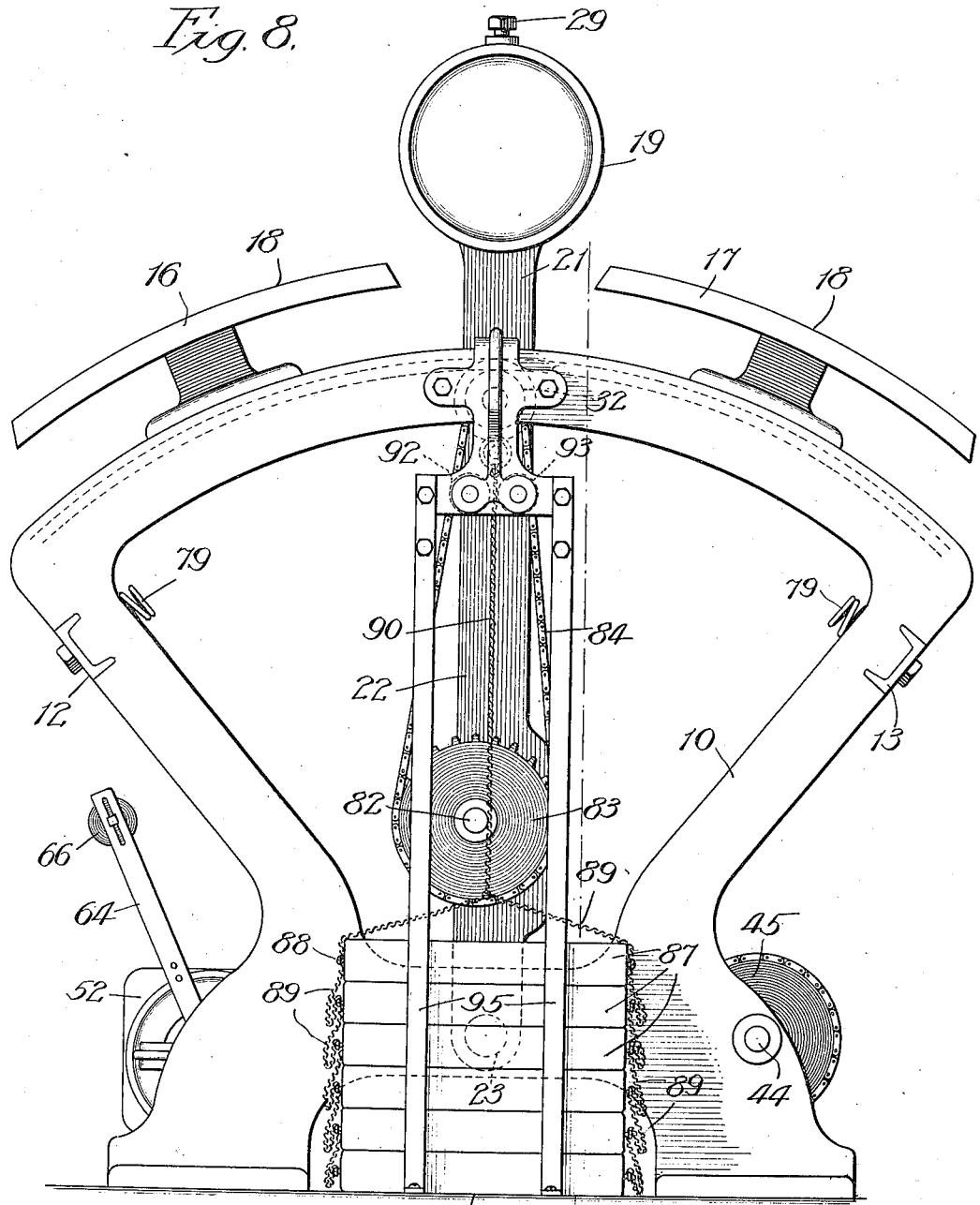

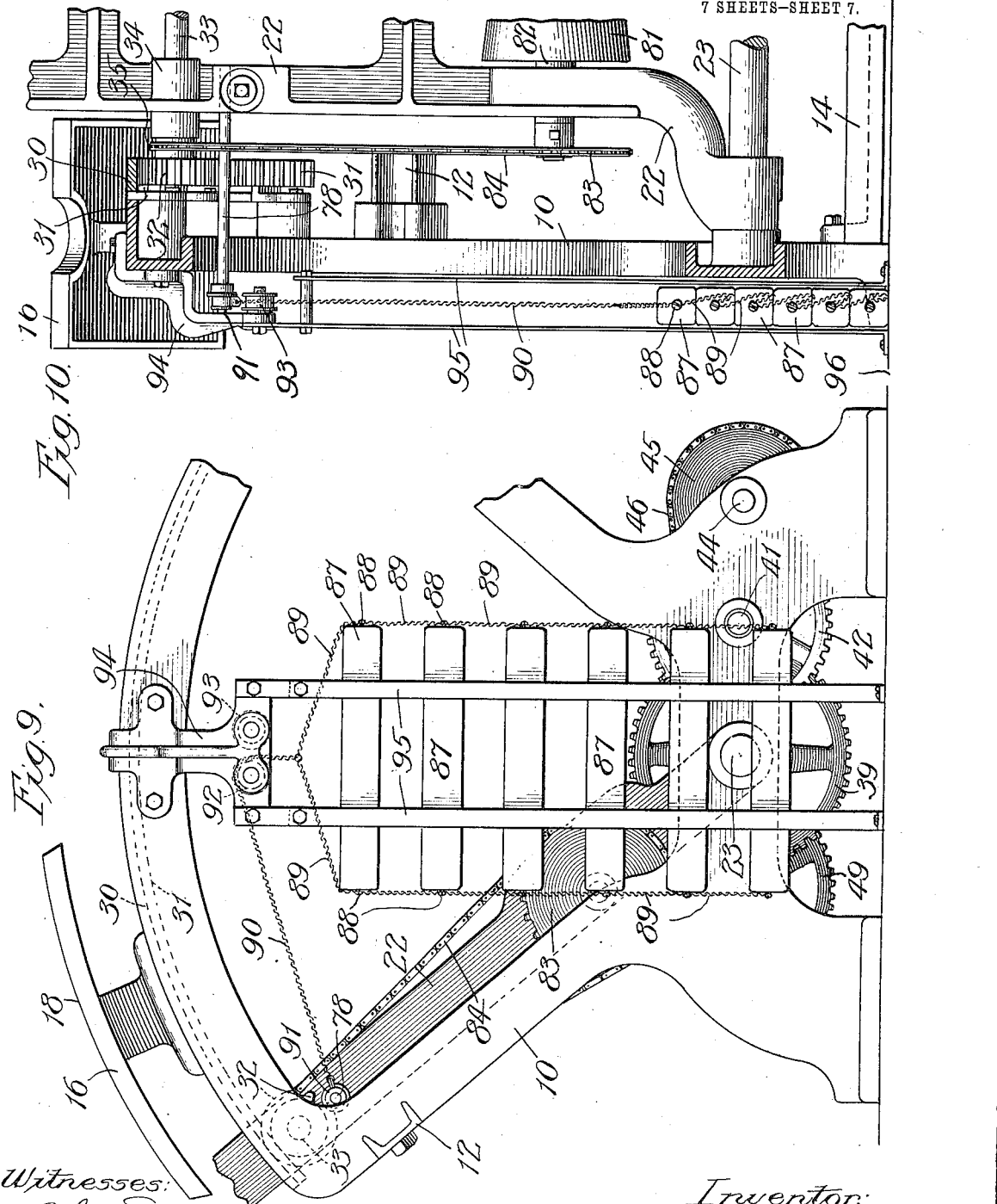

UNITED STATES PATENT OFFICE.

CHARLES T. GILMORE, OF CHICAGO, ILLINOIS.

IRONING-MACHINE.

1,029,183. Specification of Letters Patent. Patented June 11, 1912.

Application filed January 19, 1910, Serial No. 538,827. Renewed December 22, 1911. Serial No. 667,359.

*To all whom it may concern:*

Be it known that I, CHARLES T. GILMORE, a citizen of the United States, residing at Chicago, in the county of Cook and State of Illinois, have invented a new and useful Improvement in Ironing-Machines, of which the following is a specification.

My invention relates particularly to machines for ironing the bosoms of shirts; and my primary object is to provide an improved construction of ironing machine by which shirts or other articles may be ironed expeditiously, in a satisfactory manner and with the minimum expenditure of power, a further object being that of providing an inexpensive and compact construction of machine which will permit of the ironing of a relatively large number of pieces of work within a given time.

Figure 1:
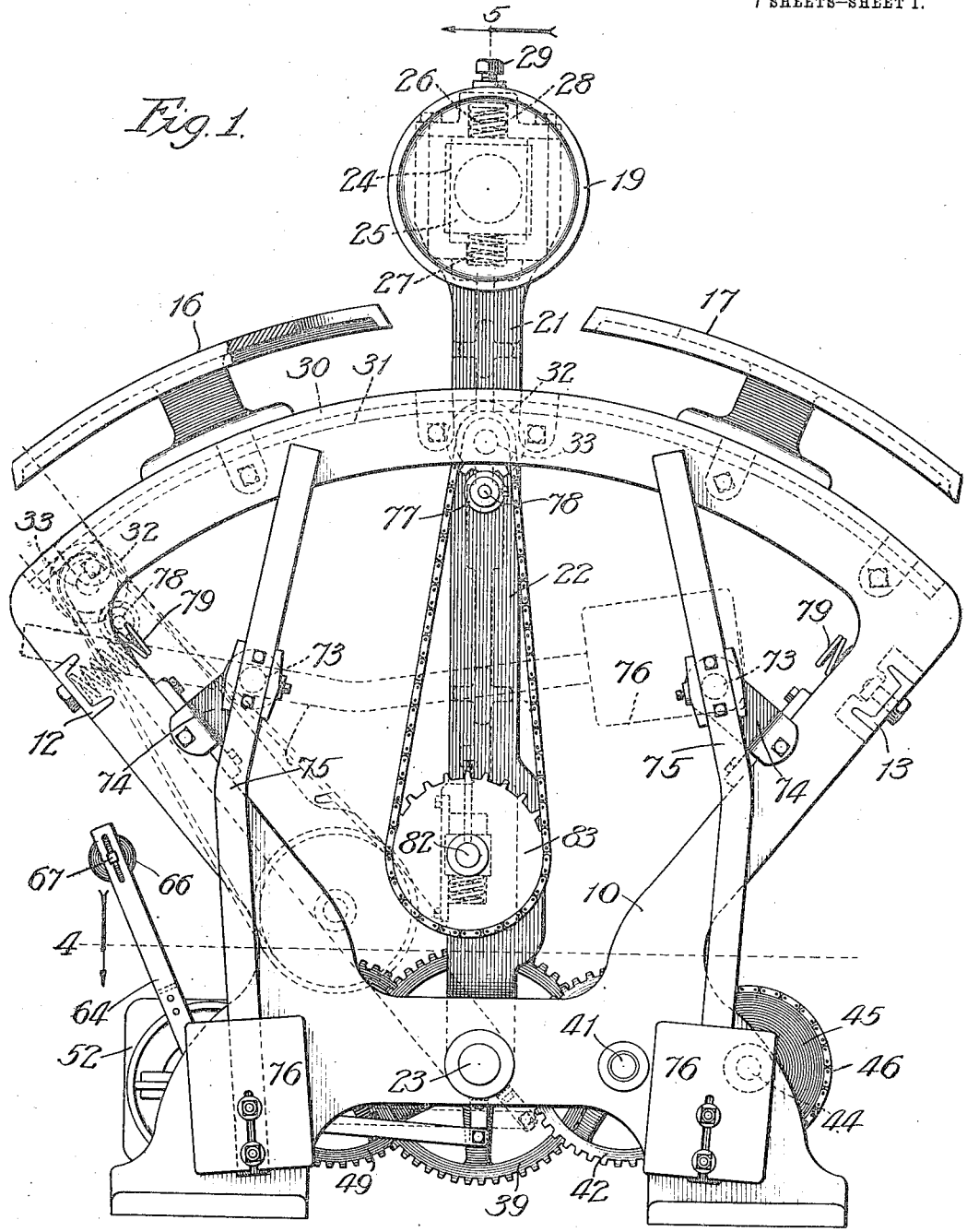
Figure 2:
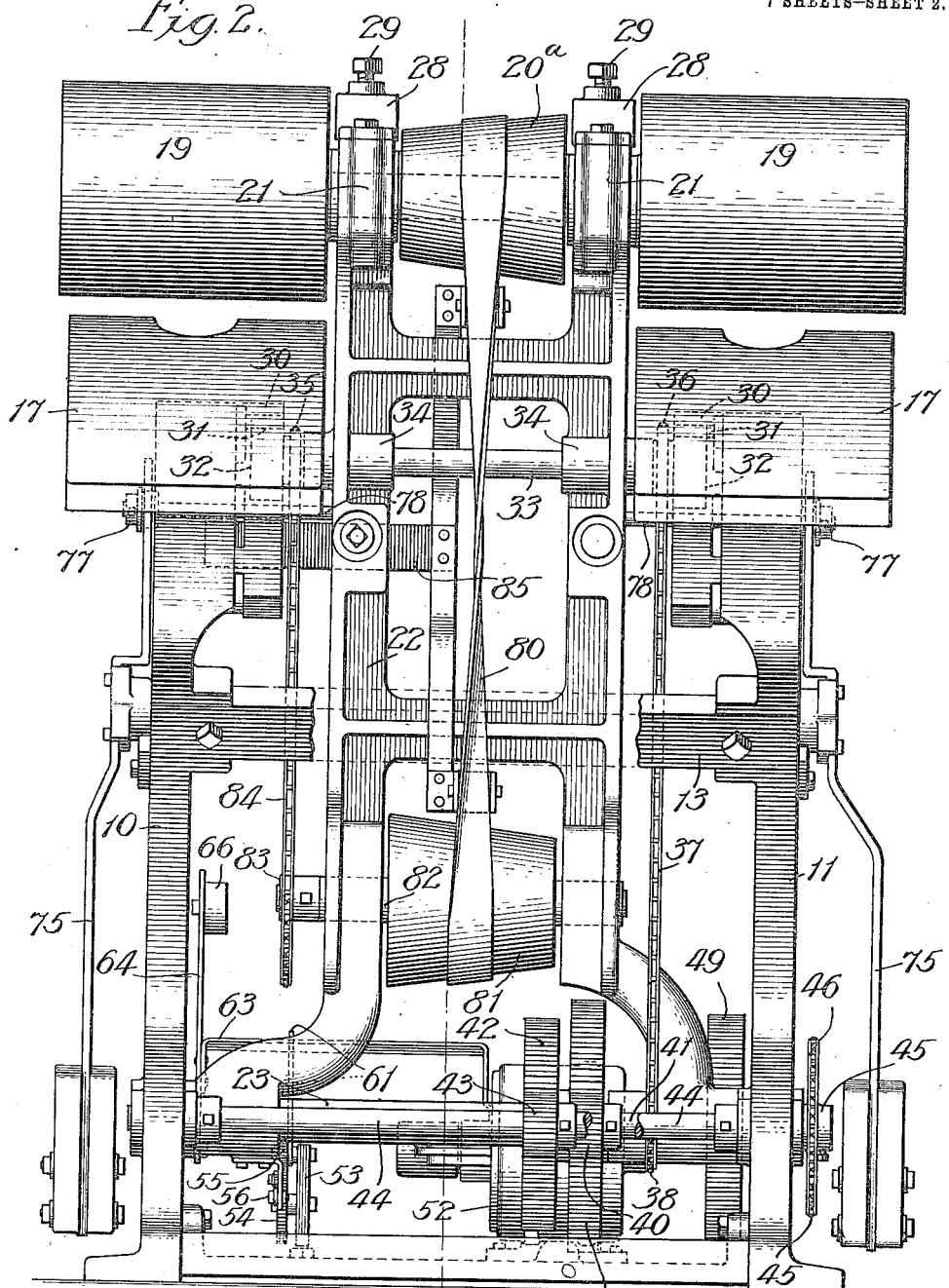
Figure 3:
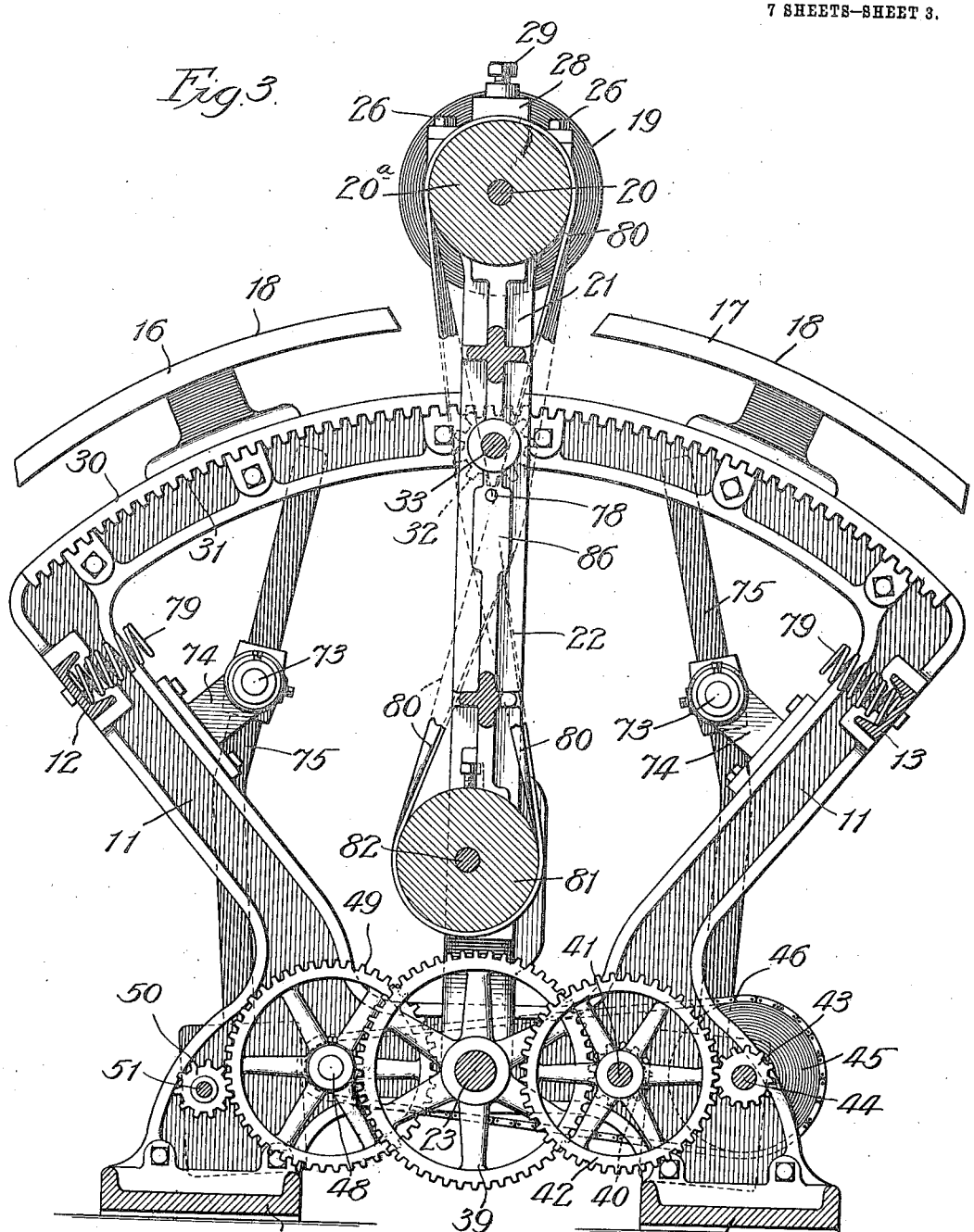
Figure 4:
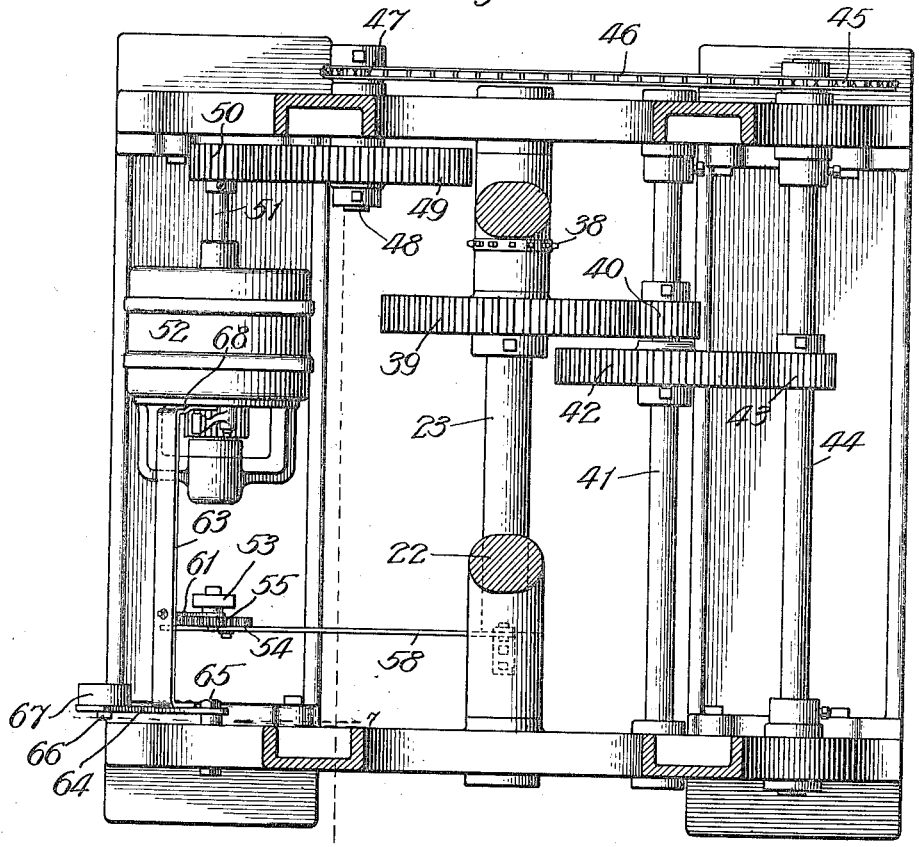
Figure 5:
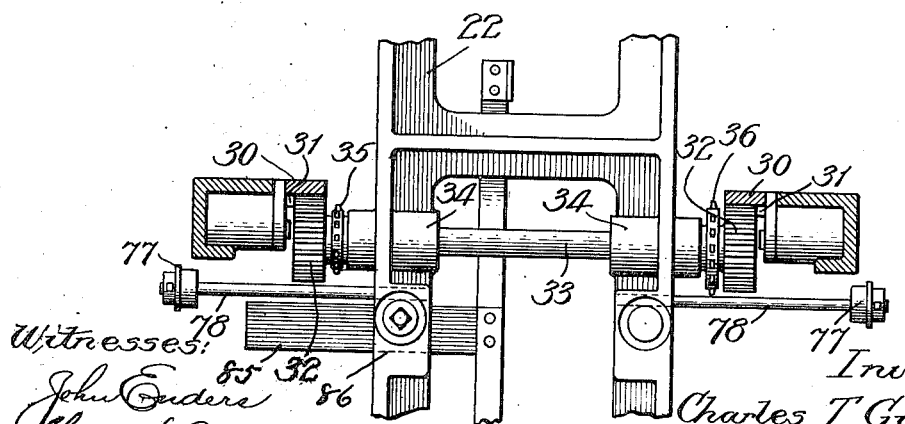
Figure 6:
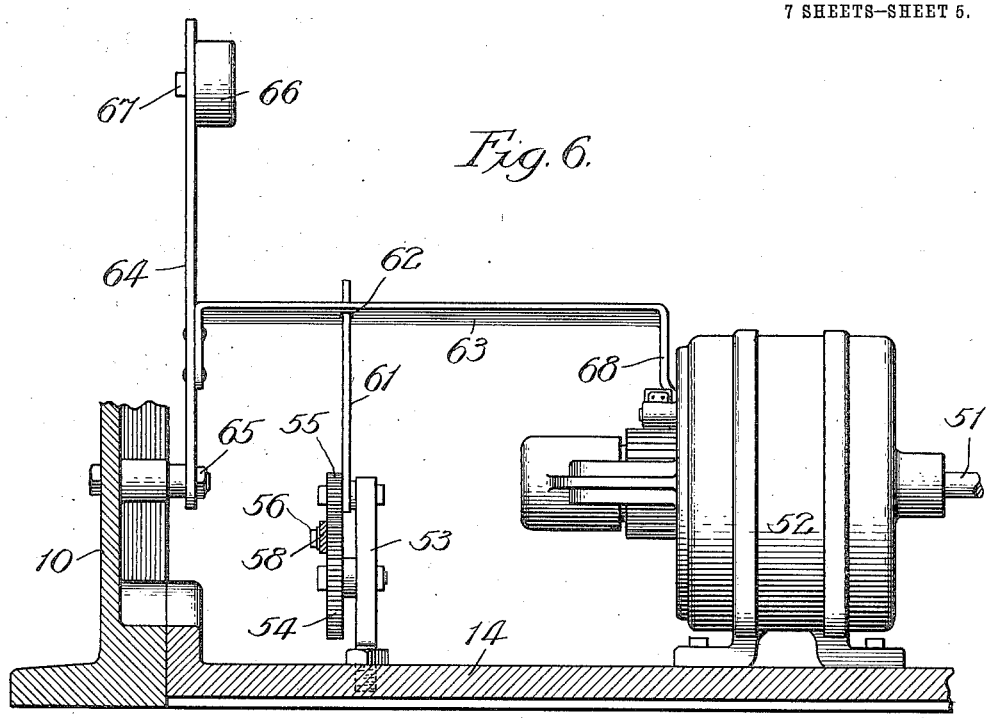
Figure 7:
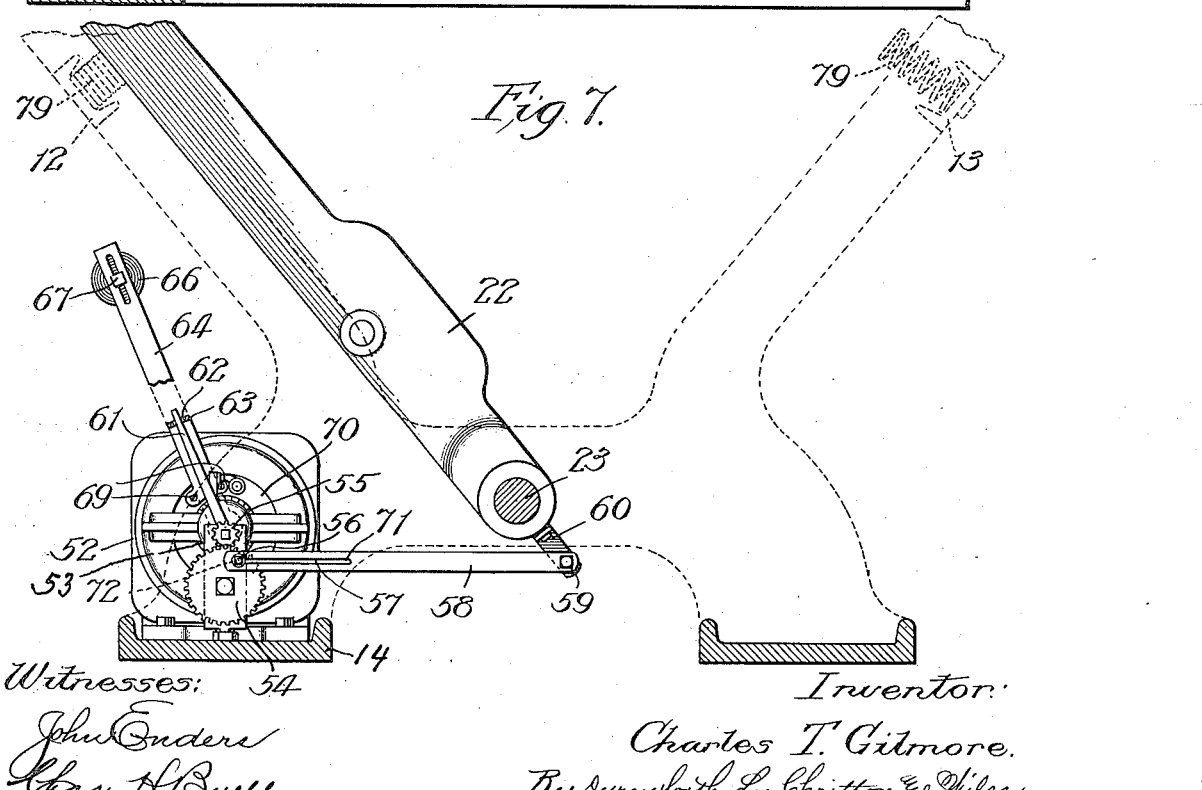

Referring to the accompanying drawings—Figure 1 is a view in side elevation of a machine constructed in accordance with my invention, the intermediate position of the oscillatory ironing-roller support being illustrated in full lines and one of the extreme positions it assumes being illustrated in dotted lines. Fig. 2 is an end view of the machine. Fig. 3 is a section taken at the line 3 on Fig. 2 and viewed in the direction of the arrow. Fig. 4 is a section taken at the dotted line 4 on Fig. 1 and viewed in the direction of the arrow. Fig. 5 is a broken section taken at the line 5 on Fig. 1 and viewed in the direction of the arrow. Fig. 6 is a section taken at the line 6 on Fig. 4 and viewed in the direction of the arrow. Fig. 7 is a section taken at the line 7 on Fig. 4 and viewed in the direction of the arrow, the frame of the machine being partly dotted and the driving-gears omitted for clearness of illustration of the reversing mechanism for the machine. Fig. 8 is a view in side elevation of the machine showing it equipped with another form of arm-counterbalancing means, these means being illustrated in normal position. Fig. 9 is a similar, but broken, view, showing the counterbalancing means in the position they assume when the arm counterbalanced thereby is at the limit of its movement in one direction; and Fig. 10, a broken section of one half of the machine taken at the line 10 on Fig. 8 and viewed in the direction of the arrow.

The frame of the machine comprises two spaced side-members 10 and 11, each preferably formed with hollow centers and having their upper surfaces of arc-shape, as clearly illustrated in Fig. 1; and cross-members 12, 13, 14 and 15. Secured on the upper surface of the frame-members 10 and 11 are ironing-boards 16 and 17 of a well-known construction, which, in practice, would be covered with padding and be provided with means for clamping the shirts in position thereon, these ironing-boards serving to support the bosoms of the shirts to be ironed. I prefer to provide four of these boards, two arranged on each side of the median line of the machine and at equal distances therefrom as represented, and having their upper surfaces of arc-shape as indicated at 18.

The ironing is performed by a pair of rollers 19 fixed on the ends of a shaft 20 journaled in the upwardly-extending arms 21 of the yoke-shaped upper end of an oscillatorily supported beam, or arm, 22 located between the side-members 10 and 11 and journaled at its lower end on a shaft 23 journaled in the lower end of the opposed frame-members 10 and 11 at a point coincident with the center from which the arc-shaped upper surfaces of the frame-members 10 and 11 and those of the bosom-boards are described. The arm 22, in the operation of the machine as hereinafter described, is caused to be oscillated from one end of the machine to the other to cause the ironing-rollers 19 carried thereby to move across and in contact with the shirt bosoms supported on the boards 16 and 17 for ironing them, the shaft carrying these rollers being preferably cushioned above and below as by forming the upper ends of the yoke-arms 21 with upright guides 24 and providing journal-boxes 25 for the shaft confined in these guides between coil-springs 26 and 27 arranged above and below the shaft, a cap 28 being provided for each box and operating to place the springs under adjustable tension as by means of set-screws 29.

I prefer to operate the arm 22 by means of an electric motor connected with automatically-operating reversing mechanism, whereby the operation of the machine may be continuous, a description of these operating and reversing means being as follows:

Each of the side-members 10 and 11 has secured to it on its inner side a curved bar 30 provided on its under side with a curved rack 31 which describes an arc, the center of which is the center of the shaft 23, these racks meshing with pinions 32 fixed on the ends of a shaft 33 journaled in bearings 34 in the arm 22 and extending parallel with the shaft 20, the shaft 33 carrying sprockets 35 and 36 preferably of different sizes as illustrated in Fig. 5. The sprocket 36 is connected by a sprocket-chain 37 with a sprocket 38 rigid on the shaft 23, the latter carrying a gear 39 rigid therewith and meshing with a pinion 40 on a shaft 41 journaled in the frame-sides. The shaft 41 carries a gear 42 meshing with a pinion 43 rigid on a shaft 44 journaled in the frame-sides, and carrying a sprocket 45 connected by a sprocket-chain 46 with a relatively small sprocket-wheel 47 fixed on a shaft 48 likewise journaled in the frame, the shaft 48 carrying a gear 49 which meshes with a pinion 50 rigid on the drive-shaft 51 of a motor, as for instance that of the electric type illustrated at 52. It will be understood from the foregoing description that by rotating the shaft 51 the arm 22 will be swung from left to right and right to left in Fig. 1, depending upon the direction in which the motor is operated, the gearing and sprocket-chain connections hereinbefore referred to serving to permit the motor and arm 22 to operate at the desired relative speeds.

Secured in upright position on the cross-member 14, adjacent to the motor 52, is a standard 53 on which an intermeshing gear and pinion 54 and 55, respectively, are journaled, the gear 54 carrying an eccentrically-disposed stud 56 which extends into a slot 57 in one end of a longitudinally movable bar 58 pivoted at its opposite end as indicated at 59 to a depending arm 60 secured to the arm 22 below the shaft 23, whereby when the arm 22 is rocked as hereinafter set forth, the bar 58 will be reciprocated, the slot 57 in the latter being somewhat shorter than the length of the stroke of the bar 58 in either direction for a purpose hereinafter set forth. The pinion 55 is rigidly connected with an upwardly-extending arm 61 which projects at its upper end through an opening 62 in a cross-bar 63 connected at one end to an upwardly-extending arm 64 pivoted at its lower end to the frame-member 10, as indicated at 65, and carrying a weight 66 on its upper end adjustable thereon as through the medium of a set-screw 67. The opposite downwardly turned end 68 of the bar 63 is connected, as indicated at 69, with a shiftable brush-carrying ring 70 journaled on the motor in position to be concentric with relation to the pivot-point 65, this ring operating, when swung from left to right and right to left, respectively, in Fig. 7, to shift the brushes of the electric motor 52 for rotating it in opposite directions, as is well understood in the art.

The operation of the machine in so far as it is above described is as follows: Assuming that the parts of the machine are in the positions illustrated in Figs. 1, 2, 3, 4 and 6, the operator, to start the machine, turns on the current of the motor, whereupon the arm 22 carrying the rollers 19 will be swung to the right in Fig. 1 by engagement of the pinions 32 with the racks 31, these pinions being driven as hereinbefore described. The ironing-rollers in this operation are caused to be moved across and in contact with the shirt-bosoms previously applied to the boards 17 for ironing them. As the rollers 19 near the extreme outer ends of the boards, an end wall 71 of the slot 57 engages with the stud 56 which latter occupies the position illustrated in Fig. 7, with the result of turning the gear 54 to the left and the pinion 55 to the right in Fig. 7, and likewise swinging the arm 61, cross-bar 63 and brush ring 70 to the right, for reversing the motor. Thus reversing the motor causes the arm 22 to rock from right to left in Fig. 1, thereby again ironing the shirt bosoms on the boards 17. The arm continues to travel to the left in Fig. 1 passing in contact with the shirt bosoms previously applied to the boards 16, until it nears the extreme outer ends of these boards, whereupon the other end wall 72 of the slot 57 engages with the stud 56 on the gear 54 and turns the latter to the right and the pinion 44 to the left in Fig. 7, with the result of again reversing the motor through the medium of the arm 61, bar 63 and ring 70, which swing to the left in Fig. 7 during this movement, the operation of reversing the motor, and consequently the direction of movement of the arm 22, continuing so long as the current is supplied to the motor. The engagement of the end walls of the slot 57 with the stud 56 in the movement of the bar 58 in opposite directions is such as to cause the weighted arm 64 to be swung beyond vertical position, whereby the weight, operating by gravity, quickly completes the movement for moving the ring to position in which the motor is reversed and thus insures reversal of the motor, it being understood that by reason of the slotted connection of the bar 58 with the stud 56, the reversing mechanism operated thereby is actuated only at the limits of the stroke of the arm 22 and that it remains at rest between such periods.

It will be understood that in the operation of the device the operator, while the ironing rollers are ironing shirts on one set of boards, may remove the shirts previously ironed on the other set and substitute others to be ironed by the rollers in their return movement.

I prefer to employ cushioning and counterbalancing means for the arm 22 operating to perform their respective functions in the movement of the arm in opposite directions for preventing undue strain on the motor and rendering possible the operation of the machine with the minimum expenditure of power, the following being a description of means suitable for these purposes. Fulcrumed as indicated at 73 on brackets 74 secured to the frame-sides 10 and 11 at the sides of the machine are four arms 75, two at each side of the median line of the machine, each of these arms being of irregular shape as represented and carrying a weight 76, these arms being so shaped that their upper ends incline upwardly toward the arm 22 and extend into the path of rollers 77 supported on laterally-extending rods 78 projecting from the arm 22 in opposite directions through the central openings in the frame-members 10 and 11. Each of the cross-bars 12 and 13 carries coiled springs 79, which incline upwardly toward the center line of the machine, these springs extending into the path of the arm 22 in its movements in opposite directions as described. As the arm 22 nears the limits of its movement in either direction, it first engages with the upper ends of the adjacent arms 75 and swings them against the action of their weights 76, and during such engagement strikes the adjacent coiled spring 79, thus compressing it, the parts being preferably so arranged that by the time the arm 22 has moved to the position illustrated in dotted lines in Fig. 1 and in full lines in Fig. 7, the bar 63 will have been shifted, and likewise the ring 70, to the positions illustrated in Fig. 7, in which the motor is caused to reverse for the purpose hereinbefore explained, it being understood that when the arm 22 swings in the opposite direction the action of the arms 75 and the spring 79 at the opposite end of the machine is the same as that just described.

It will be manifest from the foregoing that the weighted arms 75 operate, when engaged by the arm 22, to counter-balance the latter as it moves toward horizontal position when swinging on its fulcrum 23, and thus the motor is aided in raising the arm upon reversal, the motor being further aided by the recoil of the springs 79 upon reversal of the motor, whereby the machine is capable of being operated with relatively low power and without sudden jerks.

The rollers 19, which may be heated in any manner as is well known in the art, are preferably positively driven and means are provided for regulating their speed of rotation, whereby the shirt bosoms may be given a dull-finish or be finished with a gloss, these means being as follows: The shaft 20 has fixed to it a cone-pulley 20ª connected by a cross-belt 80 with an oppositely tapered cone-pulley 81 fixed on a shaft 82 journaled in the arm 22, the outer end of this shaft carrying a sprocket 83 connected with the sprocket 35 through the medium of a chain 84, whereby operation of the shaft 33, through the medium of the sprocket 36, rotates the ironing-rollers 19. By providing the cone-pulleys the connecting belt for which is shiftable by means of a belt-shifter 85 slidable in an opening 86 in the arm 22, the rollers 19 may be caused to rotate at the same speed as that at which the arm 22 travels for producing a dull finish on the bosoms, or at a greater or less speed for producing a glossy finish.

The mechanism illustrated in Figs. 8, 9 and 10, for counterbalancing the arm 22 in its movements, comprises a vertical series of metal bars 87, one series at each side of the machine, the bars of each series being connected together at their ends, as indicated at 88, by chains 89 which are united at their upper ends and connected with a chain 90 secured to the rods 78 extending from the arm 22 as indicated of one of the series at 91. Each chain passes between two spaced rollers 92 and 93 journaled on a bracket 94 secured to the adjacent frame-member of the machine. The bars 87 are preferably guidedly confined in upright guides 95 secured to the floor indicated at 96, at their lower ends and to the frame at their upper ends. The chains 89 and 90 are of such lengths and so connected with the bars that when the arm 22 is in the position represented in Fig. 8 the lowermost bar rests on the floor which thus forms a stop therefor, and bears the weight of those above it which rest thereon as illustrated in Fig. 8, and when the arm reaches the limit of movement in either direction, all of the bars will be raised from the floor and the weight thereof borne by the arm 22. It will thus be noted that as the arm swings from vertical toward horizontal position it will first raise the uppermost bar 87, and then the remainder of the bars in succession, whereby, as the arm approaches the horizontal, and the leverage exerted by it correspondingly increases, the force tending to return it to vertical position is correspondingly augmented to counterbalance, or approximately counterbalance, the arm at all times, it being understood that in the return movement of the arm 22 toward vertical position the reverse of the action just described occurs and the bars are successively seated to gradually reduce the force exerted thereby.

While I have illustrated and described my invention as embodied in a machine driven by an electric motor, it will be manifest that any other suitable power device may be employed, and so far as certain features of the invention are concerned the machine may be driven by hand power as through a crank (not shown) which may, in the preferred construction illustrated, be applied to any one of the non-bodily movable shafts, as for instance the shaft 44. It will also be understood that the machine may be equipped with more or less boards than those shown, without departing from the spirit of my invention. Furthermore, while I prefer to provide means for positively driving the rollers 19, such means may be dispensed with, and these rollers be driven by contact with the work on the boards so far as certain features of my invention are concerned.

What I claim as new, and desire to secure by Letters Patent, is—

1. An ironing-machine comprising, in combination, a frame, a support on the frame for the article to be ironed, a curved rack-device on the frame, an oscillatory member fulcrumed on the frame and movable with relation to said support, a pinion carried by said member and meshing with said rack, and ironing-means carried by said member and coöperating with said support, for the purpose set forth.

2. An ironing-machine comprising, in combination, a frame, a support on the frame for the article to be ironed, a curved rack-device on the frame, an oscillatory member fulcrumed on the frame and movable with relation to said support, a pinion carried by said member and meshing with said rack, ironing-means carried by said member and coöperating with said support, and means for actuating the pinion in opposite directions, for the purpose set forth.

3. An ironing-machine comprising, in combination, a frame, a support on the frame for the article to be ironed, a rack-device on the frame, an oscillatory member fulcrumed on the frame and movable with relation to said support, a pinion carried by said member and meshing with said rack, ironing-means carried by said member and coöperating with said support, and gear-and-sprocket mechanism operatively connected with said pinion and serving, when actuated, to rotate it in engagement with said rack, for the purpose set forth.

4. An ironing-machine comprising, in combination, a frame, a support on the frame for the article to be ironed, a member fulcrumed on the frame and movable with relation to said support, an ironing-roller journaled on said frame and provided with a cone-pulley, a second cone-pulley journaled on said member and belted to said first-named cone-pulley, means for oscillating the arm in opposite directions, and means for driving said last-named cone-pulley, for the purpose set forth.

5. An ironing-machine comprising, in combination, a frame, a support on the frame for the article to be ironed, a rack on the frame, an oscillatory member fulcrumed on the frame and movable with relation to said support, an ironing-roller journaled on said member, a shaft carried by said member and provided with a pinion meshing with said rack, means for driving said shaft, and means operated by the movement of said shaft for driving said roller, for the purpose set forth.

6. An ironing-machine comprising, in combination, a frame, a support on the frame for the article to be ironed, a rack on the frame, an oscillatory member fulcrumed on the frame and movable with relation to said support, an ironing-roller journaled on said member, a shaft carried by said member and provided with a pinion meshing with said rack, means for driving said shaft, and means operated by the movement of said shaft for driving said roller, said last referred to means being adjustable for varying the speed at which said roller operates, for the purpose set forth.

7. An ironing-machine comprising, in combination, a frame, a support on said frame for the article to be ironed, a rack carried by said frame, an oscillatory member supported on the frame and movable with relation to said support, a roller journaled on said member, a shaft journaled on said member and provided with a pinion engaging with said rack, a cone-pulley rotatable with said roller, a second cone-pulley journaled on said member and belted to said first-named cone-pulley, means for rotating said pinion, and means operatively connected with said pinion and with said second-named cone-pulley for operating the latter, for the purpose set forth.

8. An ironing-machine comprising, in combination, a frame, a support on the frame for the article to be ironed, an oscillatory member fulcrumed on the frame and movable with relation to said support, a rack-device on said frame, an ironing-roller journaled on said member and coöperating with said support, a shaft journaled on said member and carrying a pinion meshing with said rack, a second shaft journaled on said member having chain-and-sprocket connection with said first-named shaft and carrying a cone-pulley, a second cone-pulley rotatable with said roller and belted to said first-named cone-pulley, a sprocket-wheel on said first-named shaft, a second sprocket-wheel journaled on the machine concentric with the fulcrum of said oscillatory member and operatively connected with said first-named sprocket-wheel, and means for actuating said second-named sprocket, for the purpose set forth.

9. An ironing-machine comprising, in combination, a frame, a support on the frame for the article to be ironed, an oscillatory member fulcrumed on the frame and movable with relation to the support, an ironing-roller carried by said member and coöperating with said support, and counterbalancing mechanism for said member operating to compensate for the increasing leverage exerted by said member in moving from vertical toward horizontal position, comprising a plurality of weights connected together and with said member, and means for supporting said weights when said member is in vertical position for removing the load thereof from the latter, the connections between said member and weights being constructed and arranged to cause them to be unseated in succession for exerting increasing pull upon said member as it moves from the vertical toward horizontal position.

10. An ironing-machine comprising, in combination, a frame, a support on the frame for the article to be ironed, an oscillatory member fulcrumed on the frame and movable with relation to the support, an ironing-roller carried by said member and coöperating with said support, and counter-balancing mechanism for said member operating to compensate for the increased leverage exerted by said member in moving from vertical toward horizontal position, comprising a plurality of weights connected together and with said member, guides for the weights, and means for supporting said weights when said member is in vertical position for removing the load thereof from the latter, the connections between said member and weights being constructed and arranged to cause them to be unseated in succession for exerting increasing pull upon said member as it moves from the vertical toward horizontal position.

11. An ironing-machine comprising, in combination, a frame, a support on the frame for the article to be ironed, an oscillatory member fulcrumed on the frame and movable with relation to the support, an ironing-roller carried by said member and coöperating with said support, and counter-balancing mechanism for said member operating to compensate for the increased leverage exerted by said member in moving from vertical toward horizontal position, comprising a plurality of weights connected together, a bearing-surface on the frame above said weights, a flexible member connected with said first-named member and with said weights and engaging with said bearing-surface, and means for supporting said weights when said first-named member is in vertical position, the connections between said weights being constructed and arranged to cause them to be unseated in succession for exerting increasing pull upon said oscillatory member as it moves from vertical toward horizontal position.

12. An ironing-machine comprising, in combination, a frame, a support on the frame for the article to be ironed, an oscillatory member fulcrumed on the frame and movable with relation to the support, an ironing-roller carried by said member and coöperating with said support, and counter-balancing mechanism for said member operating to compensate for the increasing leverage exerted by said member in moving from vertical toward horizontal position, comprising a plurality of weights flexibly connected together to permit them to move with relation to each other, and connected with said member, and means for supporting said weights when said member is in vertical position, the connections between said member and weights operating to cause them to be unseated in succession for increasing pull upon said member as it moves from vertical toward horizontal position.

13. An ironing-machine comprising, in combination, a frame, a support on the frame for the article to be ironed, an oscillatory member fulcrumed on the frame and movable with relation to the support, an ironing-roller carried by said member and coöperating with said support, and counter-balancing mechanism for said member operating to compensate for the increasing leverage exerted by said member in moving from vertical toward horizontal position, comprising a plurality of weights connected together by flexible members permitting said weights to be moved toward and away from each other, a bearing on said frame above said weights, a flexible member connected with said oscillatory member and with the upper one of said weights and engaging said bearing-surface, and means for supporting said weights when said member is in vertical position, the connections between said member and said weights operating to cause the latter to be unseated in succession for exerting increasing pull upon said oscillatory member as it moves from vertical toward horizontal position.

14. An ironing-machine comprising, in combination, a frame, a support on the frame for the article to be ironed, an oscillatory member fulcrumed on the frame and movable with relation to the support, an ironing-roller carried by said member and coöperating with said support, and counterbalancing mechanism for said member operating to compensate for the increasing leverage exerted by said member in moving from vertical toward horizontal position, comprising a plurality of weights connected together, a flexible connecting medium between said member and said weights, a pair of bearing surfaces on the frame between which said flexible medium is interposed, and means for supporting said weights when said member is in vertical position, the connections between said weights being constructed and arranged to cause them to be unseated in succession for exerting increasing pull upon said member as it moves from vertical toward horizontal position.

15. An ironing machine comprising, in combination, a frame, a support on the frame for the article to be ironed, an oscillatory member fulcrumed on the frame and movable with relation to said support, ironing-means on said member coöperating with said support, an electric motor operatively connected with said oscillatory member for actuating it in opposite directions, and means operating automatically to reverse the movement of the motor comprising a shiftable device carrying the brushes of the motor, a longitudinally shiftable rod connected with said oscillatory member, and gear-mechanism operatively connected with said rod and said shiftable device for shifting the latter, for the purpose set forth.

16. An ironing-machine comprising, in combination, a frame, a support on the frame for the article to be ironed, an oscillatory member fulcrumed on the frame and movable with relation to said support, ironing-means on said member coöperating with said support, an electric motor operatively connected with said oscillatory member for actuating it in opposite directions, and means operating automatically to reverse the movement of the motor, comprising a shiftable device connected with the brushes of the motor, a reciprocatory member operated by the movement of said oscillatory member, a weighted device connected with said shiftable device, and gear mechanism operatively connected with said weighted device and with said reciprocatory member, the connection between said gear mechanism and said reciprocatory member operating to actuate the gear in opposite directions, for the purpose set forth.

17. An ironing-machine comprising, in combination, a frame, a support on the frame for the article to be ironed, an oscillatory member fulcrumed on the frame and movable with relation to said support, ironing-means on said member coöperating with said support, an electric motor operatively connected with said oscillatory member for actuating it in opposite directions, and means operating automatically to reverse the movement of the motor, comprising a shiftable device carrying the brushes of the motor, gear mechanism operatively connected with said shiftable device, and a reciprocatory bar actuated by said oscillatory member in its movements in opposite directions and containing a slot engaging a pin eccentrically connected with one of said gears, for the purpose set forth.

18. An ironing-machine comprising, in combination, a frame, a support on the frame for the article to be ironed, an oscillatory member fulcrumed on the frame and movable with relation to said support, ironing means on said member coöperating with said support, an electric motor operatively connected with said oscillatory member for actuating it in opposite directions, and means operating automatically to reverse the movement of the motor, comprising a shiftable device carrying the brushes of the motor, a weighted device connected with said shiftable device, gear mechanism connected with said weighted device, and a reciprocatory member operated through the medium of said oscillatory member in the movements of the latter and containing a slot through which an eccentric stud connected with one of said gears extends, for the purpose set forth.

19. An ironing-machine comprising, in combination, a frame, a support on the frame for the article to be ironed, an oscillatory member fulcrumed on the frame and movable with relation to said support, ironing-means on said member coöperating with said support, an electric motor operatively connected with said oscillatory member for actuating it in opposite directions, and means operating automatically to reverse the movement of the motor, comprising a brush-carrying ring, a cross-bar connected with said ring and pivotally supported at its opposite end upon the frame, an upwardly projecting weighted extension on said cross-bar, gear-mechanism, an arm connected with one of said gears and engaging with said cross-bar, a stud eccentrically connected with the other of said gears, and a bar eccentrically connected near one end with said oscillatory member and containing a slot near its opposite end through which said stud extends, for the purpose set forth.

20. An ironing-machine comprising, in combination, a frame, a support on the frame for the article to be ironed, an oscillatory member fulcrumed on the frame and movable with relation to said support, ironing-means on said member coöperating with said support, an electric-motor operatively connected with said oscillatory member for actuating it in opposite directions, and means operating automatically to reverse the movement of the motor, comprising a shiftable device carrying the brushes for the motor, gear-mechanism for operating said shiftable device, and means operated by said oscillatory member in its movements for actuating said gear-mechanism, for the purpose set forth.

21. An ironing-machine comprising, in combination, a frame, a support on the frame for the article to be ironed, an oscillatory member fulcrumed on the machine and movable with relation to said support to one side of vertical position, means for actuating said member in opposite directions, counterweight mechanism in addition to said member-driving means coöperating with said member in its movements beyond said vertical center and operating to compensate for the increasing leverage exerted by said member as it swings toward horizontal position, and means engageable by said member at the limit of its movement for aiding in the initial movement of said member toward vertical position upon reversal.

CHARLES T. GILMORE.

In presence of—
R. A. SCHAEFER,
W. B. DAVIES.